United States Patent [19]
Gust

[11] Patent Number: 6,125,775
[45] Date of Patent: Oct. 3, 2000

[54] SYSTEM FOR GAUGE WHEEL LOAD ADJUSTMENT

[75] Inventor: Jacob Neil Gust, Fargo, N. Dak.

[73] Assignee: Case Corporation, Racine, Wis.

[21] Appl. No.: 09/162,925

[22] Filed: Sep. 29, 1998

[51] Int. Cl.[7] .......................... A01B 63/11; A01B 63/02
[52] U.S. Cl. .......................... 111/52; 172/316; 172/328; 172/456; 172/467
[58] Field of Search .................... 172/316, 315, 172/328, 327, 326, 324, 400, 321, 449, 678, 456, 467, 483, 448, 440, 439, 454, 455; 111/52, 200

[56] References Cited

U.S. PATENT DOCUMENTS

| | | |
|---|---|---|
| 3,121,987 | 2/1964 | Harris ................................ 172/316 X |
| 3,233,682 | 2/1966 | Thompson . |
| 3,266,181 | 8/1966 | Olafson .............................. 172/316 X |
| 3,356,382 | 12/1967 | Fay .................................... 172/316 X |
| 3,494,427 | 2/1970 | Greig et al. .......................... 172/316 |
| 3,534,819 | 10/1970 | Grover ................................ 172/316 |
| 4,203,275 | 5/1980 | Vermeer ................................ 56/15.8 |
| 4,337,832 | 7/1982 | Whitlow .............................. 172/316 X |
| 4,747,257 | 5/1988 | Hutchison ............................. 56/15.8 |
| 4,809,786 | 3/1989 | Hoehn et al. .......................... 172/316 |
| 4,903,781 | 2/1990 | Smit ..................................... 172/316 |
| 4,915,014 | 4/1990 | Gilmore et al. ................... 172/316 X |
| 4,920,732 | 5/1990 | Lee et al. ........................... 172/321 X |
| 5,409,069 | 4/1995 | Hake .................................. 172/328 X |
| 5,562,165 | 10/1996 | Janelle et al. ..................... 172/315 X |

*Primary Examiner*—Christopher J. Novosad
*Attorney, Agent, or Firm*—Mayer, Brown & Platt

[57] ABSTRACT

A system for ensuring the uniform height of gauge wheels for a towed implement assembly such as a seeder. The seeder has a frame structure with a series of front gauge wheels suspended by the front of the frame structure. A greater number of rear wheels are suspended by the frame structure to the rear of the front gauge wheel. A tow hitch is pivotally connected from the front of the frame structure for coupling to a work vehicle. A front bar having a first end and a second end is coupled to the tow hitch. A center actuator such as a hydraulic cylinder is coupled to one end of the front bar. A rear bar is placed in contact with the opposite end of the hydraulic cylinder. The front gauge wheels are raised by extending the cylinder and causing force to be applied to the front and rear bars. In this manner, the weight on the front wheels is distributed to the work vehicle via the tow hitch and the rear wheels.

12 Claims, 5 Drawing Sheets

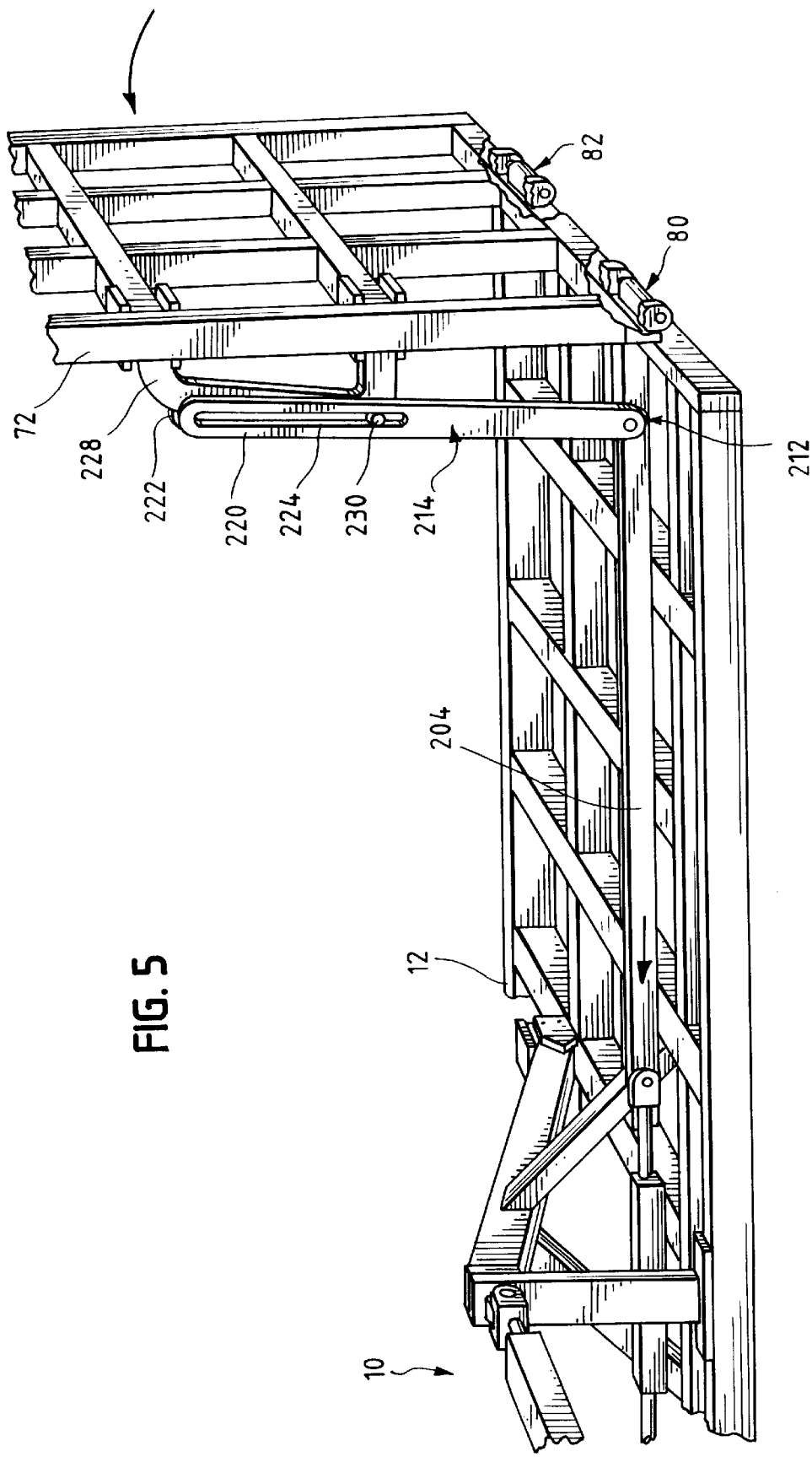

SYSTEM FOR GAUGE WHEEL LOAD ADJUSTMENT

FIELD OF INVENTION

This invention relates to a system for uniform leveling of a seeder device. More specifically, this invention relates to a system for a seeder which distributes weight from front gauge wheels to rear wheels and a towing work vehicle.

BACKGROUND OF INVENTION

Typical agricultural seeders are wheeled implements which are towed by agricultural work vehicles such as tractors. A seeder has a frame structure which has containers for seeds and a number of seed insertion devices such as cutting disks, shanks or air drills. The seed insertion devices are arranged in horizontal rows to provide uniform application of the seeds in rows in the soil. A large area of a field may thus be seeded in a single pass with the work vehicle.

The seeder has a frame structure of interlocking tubes which is supported by a number of wheels. Typically the frame structure has a number of front gauge wheels and rear packing wheels. The front gauge wheels are in closer proximity to the seed insertion devices and are adjustable to change the depth at which the seed insertion devices plant the seeds into the soil. The front gauge wheels may be raised or lowered relative to the frame structure depending on the depth an operator desires to plant the seeds. The rear packing wheels are somewhat larger but greater in number than the front gauge wheels. The rear packing wheels stabilize the seeder and tamp down the soil over the planted seeds.

The overall weight of the seeder is typically equally distributed between the front and rear wheels. However, since there are fewer front gauge wheels than rear packing wheels, greater weight is placed on each front gauge wheel. Because of the uneven weight distribution, in soft or wet soil conditions, the front gauge wheels tend to sink or become plugged with soil. This results in seed insertion which is uneven or deeper than desired. Improper seed depth adversely effects the crop yield. Additionally, miring the front gauge wheels causes strain on the work vehicle and creates the threat of miring the work vehicle and seeder causing an interruption of seeding operations.

Thus, there exists a need for a seeder system which allows weight to be redistributed from the front gauge wheels. There is a further need for a seeder system which allows the front gauge wheels to function without miring the front of the seeder. There is also a need for a seeder which will transfer weight from the front gauge wheels to a towing work vehicle.

SUMMARY OF THE INVENTION

The present invention is embodied in a weight distribution system for a towed implement assembly. The towed implement assembly has a frame structure a front gauge wheel suspended by the frame structure, and a rear wheel suspended by the frame structure, to the rear of the front gauge wheel. A tow hitch has one end pivotally connected to the front of the frame structure and an opposite end for coupling the assembly to a work vehicle. The weight distribution system has a front brace having a first end suspended above the tow hitch and a second end coupled to the opposite end of the tow hitch. A center actuator has a front member and a rear member which may be moved relative to each other. The front member is coupled to the first end of the front brace. A rear brace has a first end suspended above the frame structure and a second end in contact with the rear member of the center actuator. The front gauge wheel is raised when the front and rear members are moved relative to each other by the center actuator.

The invention is also embodied in a method of distributing weight on a towed implement assembly having a frame structure with a front gauge wheel, a rear wheel to the rear of the front gauge wheel. The towed implement assembly also has a tow hitch having a rear end pivotally coupled to the front of the frame structure and a front end coupled to a work vehicle. The method involves providing a front brace sloped between the front end of the tow hitch and a point above the front of the frame structure. A sloped rear brace is provided between the rear end of the frame structure and a point above the rear of the frame structure. Force is provided between the front and rear brace such that the frame structure rotates around the rear wheel and the tow hitch pivots such that weight is distributed to the rear wheel and the work vehicle.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 5 is a perspective view of the seeder with the weight distribution system according to the present invention with the wing members in an up position.

DESCRIPTION OF THE PREFERRED EMBODIMENT

Figure 1:
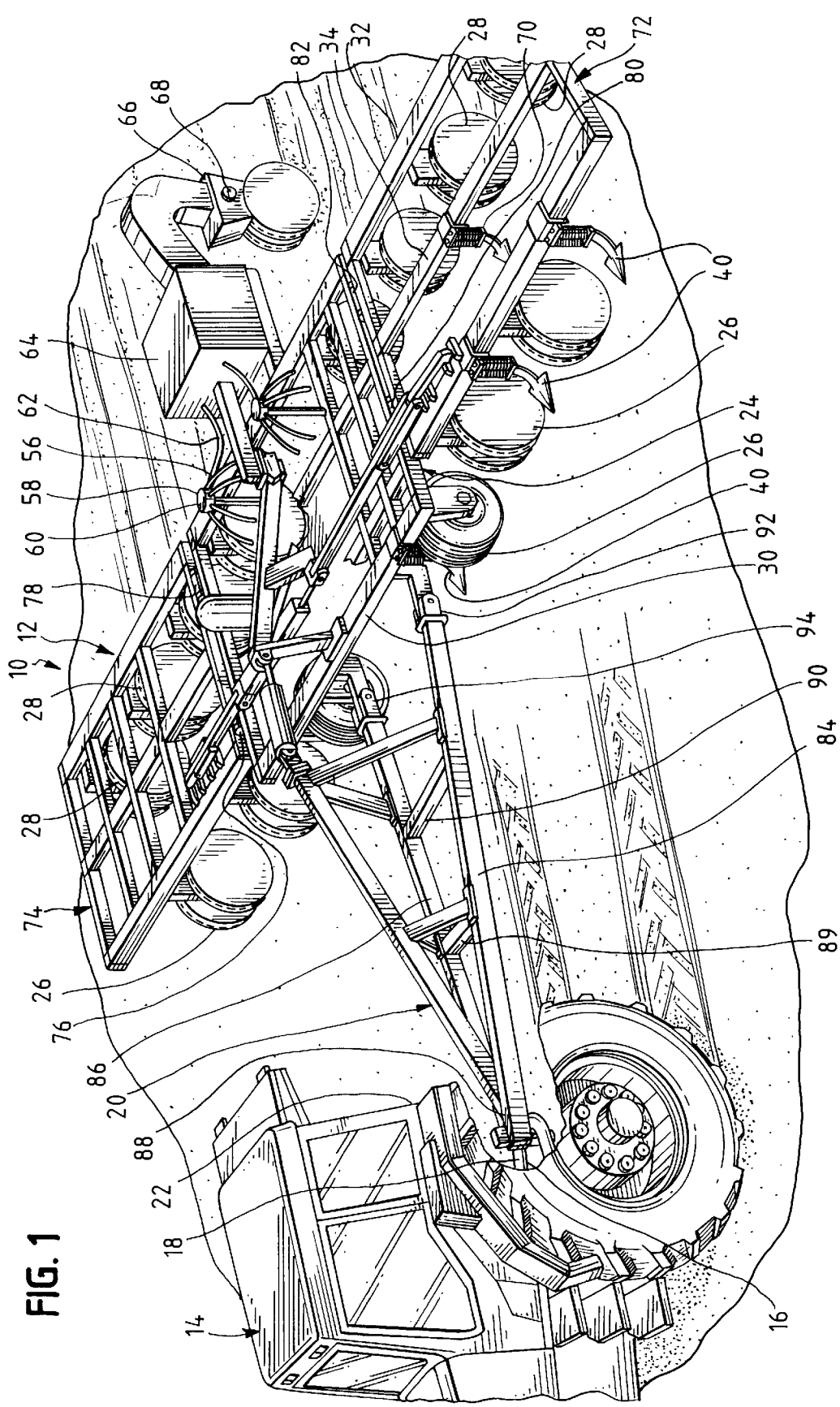
FIG. 1 is a perspective view of a work vehicle and a seeder using a gauge wheel weight distribution system according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIG. 1 which shows a perspective view of a weight distribution system 10 according to the present invention. The weight distribution system 10 is mounted on a seeder 12 which is towed by a work vehicle 14. The work vehicle 14 may be any vehicle which is capable of towing the seeder 12 around. In this embodiment, the work vehicle 14 is a tractor. The work vehicle 14 has a drawbar 16 which has a hitch point 18 coupled to a tow hitch 20 of the seeder 12. The work vehicle 14 also has a hydraulics port 22 which may supply hydraulic power to the seeder 12.

In the preferred embodiment, the seeder 12 is a modified Concord Model 3310 Seeder manufactured by Case Corp. It is to be understood that the present invention may be used with any seeder or similar implement. The seeder 12 has a planar support frame 24 having interconnecting cross members which support the various components of the seeder 12. The seeder 12 is supported by a series of front gauge wheels 26 and rear packing wheels 28 which are suspended by the support frame 24. In the preferred embodiment there are forty rear packing wheels 28 and a lesser number of front gauge wheels 26, i.e. eight wheels (for clarity, not all of the wheels or cross members are shown in FIG. 1). As will be explained below the weight of the seeder 12 under normal operations is distributed equally between the front gauge wheels 26 and the rear packing wheels 28.

The seeder 12 has a front support bar 30 which is perpendicular to the lateral axis of the seeder 12. The support frame 24 has a rear support bar 32 which is located at a set distance to the rear of the front support bar 30. The rear support bar 32 and the front support bar 30 are interconnected with cross members. Additional lateral bars such as a middle support bar 34 may be located between the front and rear support bars 30 and 32.

Figure 2:
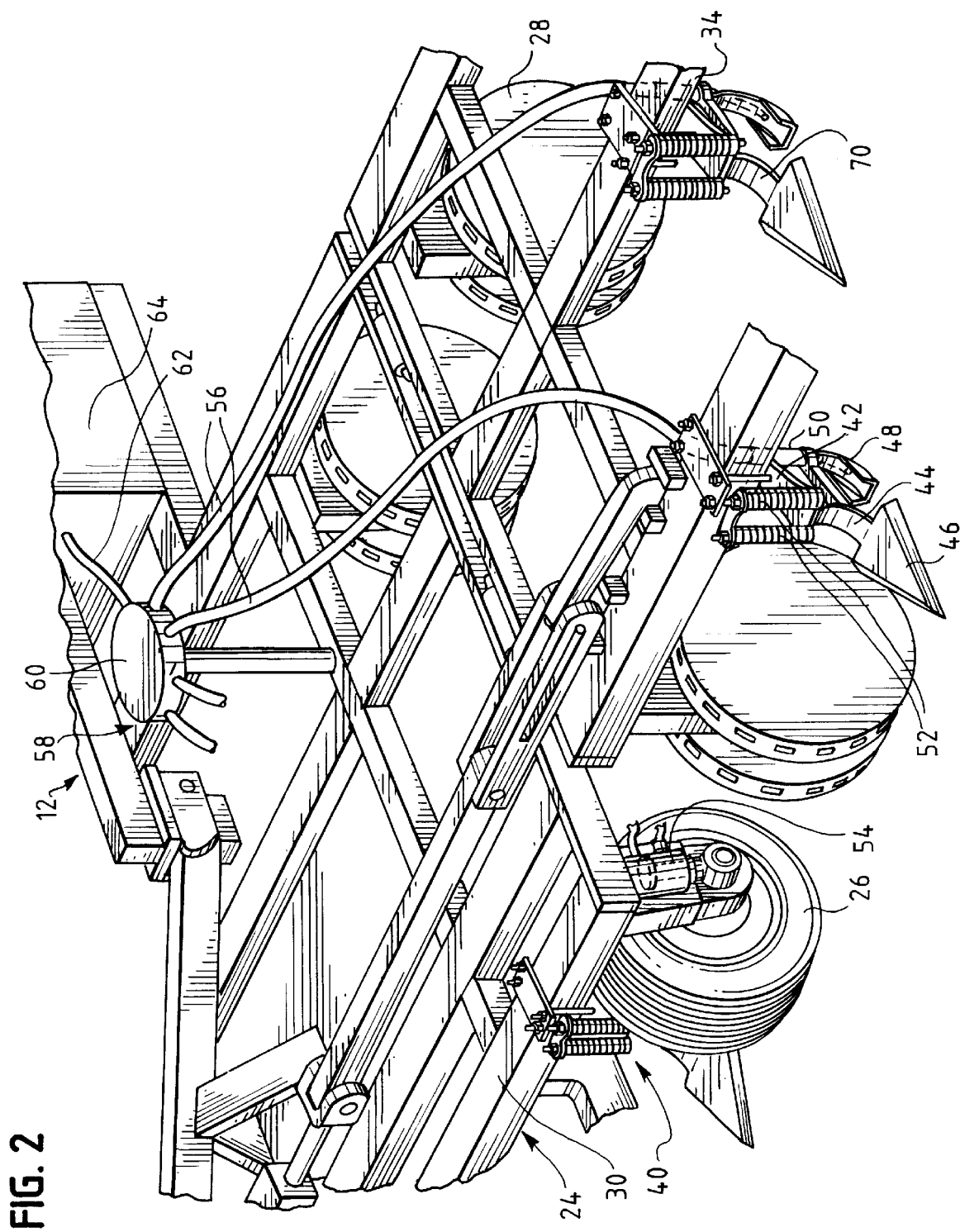
FIG. 2 is a close up view of a seed insertion device attached to the seeder in FIG. 1.

The front support bar 30 suspends a row of seed insertion devices 40. FIG. 2 shows a closeup view of one of the seed insertion devices 40. The seed insertion devices 40 each have a mounting bar 42 which has one end bolted to the front support bar 30. A shank 44 is coupled to the opposite end of the mounting bar 42. The shank 44 has a triangular cutting blade 46 which is in contact with the soil surface. A seed boot 48 with a hollow tube 50 is provided behind the shank 44. A pair of springs 52 provide downward force on the shank 44. The depth of the seed insertion device 40 may be controlled via depth control apparatus which is a hydraulic cylinder 54 which is coupled to the front gauge wheel 26.

In operation, the shank 44 cuts a furrow in the soil. The seeds are inserted through the hollow tube 50 in the seed boot 48. The front gauge wheels 26 are spaced along the front support bar 30 and may be adjusted by the hydraulic cylinder 54 to allow deeper or shallower furrows. Each shank 44 has a corresponding rear packing wheel 28. The rear packing wheels 28 tamp the soil over the furrow created by the cutting blade 46 to seal the seeds. Of course other seed insertion devices such as disks may be used instead of the shank 44.

With reference to FIGS. 1 and 2, a series of hoses 56 are coupled to a number of distributors 58. Each hose 56 is coupled to the hollow tube 50 of the seed boot 48 of each seed insertion device 40. The distributor 58 has a cylindrical housing 60 which is coupled to one end of a flexible hose 62. The other end of the flexible hose 62 is coupled to a seed container such as a seed tank 64.

The seed tank 64 is mounted on the rear of the support frame 24 on rear support bar 32. A compressor 66 is coupled to a motor 68. The compressor 66 provides pressurized air to the seed tank 64. Alternatively a larger seed tank may be towed behind the seeder 12.

The pressure created by the compressor 66 creates air flow through the flexible hose 62 to the distributor 58 and to each seed insertion device 40. Thus, seeds are propelled by air pressure to flow from the seed tank 64 through the hose 62 to the distributor 56 through the hose 54 to the seed insertion device 40. It is to be understood that other materials such as insecticides, fertilizers, or herbicides may be stored in the seed tank 64 and distributed using the seed insertion devices 40.

The seed insertion devices 40 may be suspended at set intervals on the front support bar 30 in order to provide wider or narrower seeding widths. Additional seed insertion devices 70 may be suspended by other support bars such as the middle support bar 34. The seed insertion devices 70 function in the same manner as seed insertion devices 40. Other rows of seed insertion devices may be added if needed.

The support frame 24 has a folding left wing 72 and a folding right wing 74. The wings 72 and 74 may be folded to the center of the seeder 12 for transport or storage of the seeder 12. The wings 72 and 74 are shown in the down position in FIG. 1. The right wing 74 is attached to the support frame 24 via hinges 76 and 78. The left wing 72 is attached to the support frame 24 via hinges 80 and 82. The wings 72 and 74 are hydraulically operated using hydraulic actuators (not shown). The hydraulic flow for the actuators is supplied from the work vehicle 14 through the hydraulics port 22.

The tow hitch 20 has two arms 84 and 86 which extend back from a coupler 88 which is attached to hitch point 18 of the drawbar 16. Two cross braces 89 and 90 separate and attach the arms 84 and 86. The two arms 84 and 86 are attached to the front of the support frame 24 by pivots 92 and 94 respectively. The tow hitch 20 thus can pivot up and down relative to the support frame 24. In this manner, less stress is placed on the seeder 12 when being towed over uneven terrain.

Figure 3:
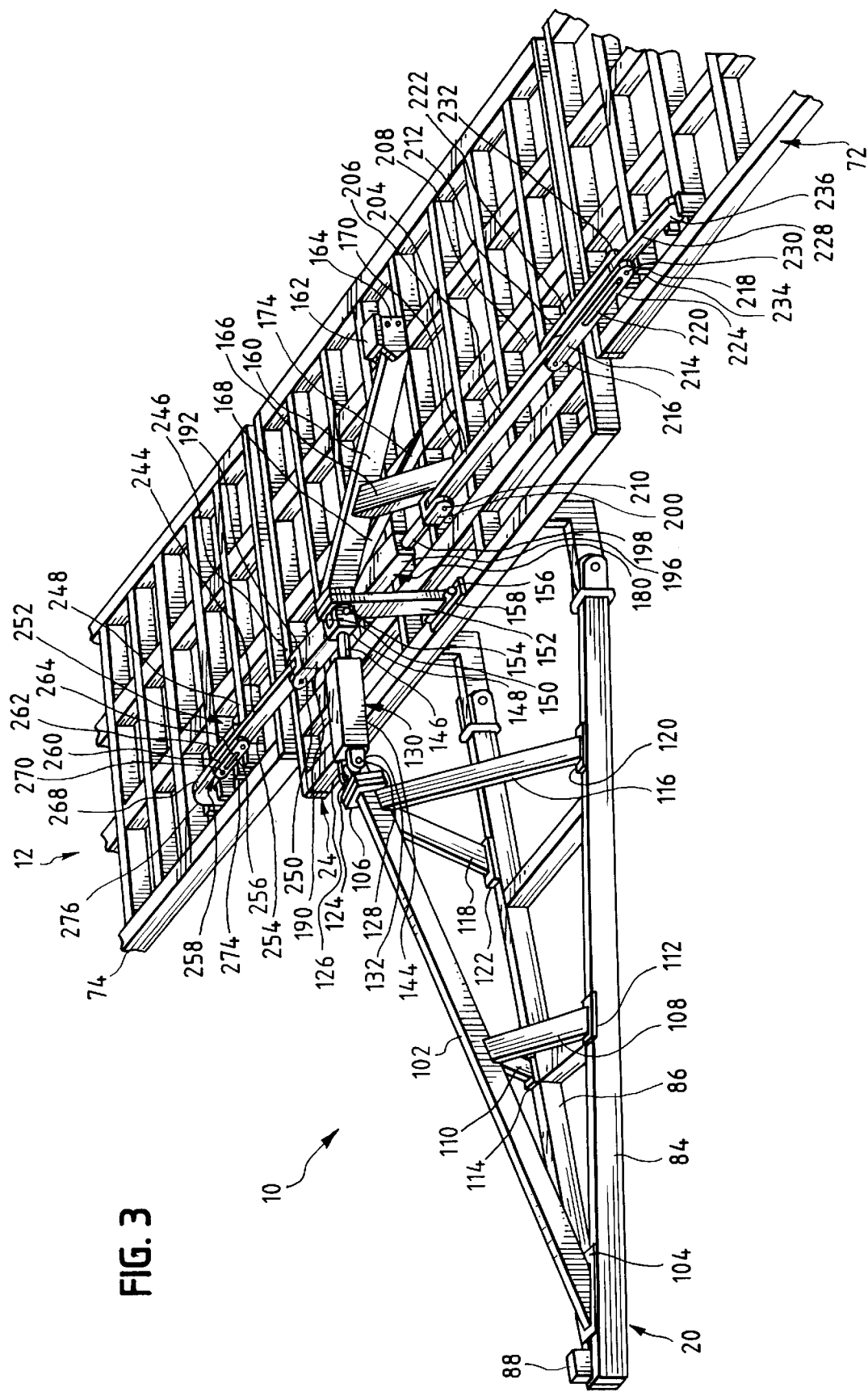
FIG. 3 is a perspective view of the seeder with the weight distribution system according to the present invention.
Figure 4:
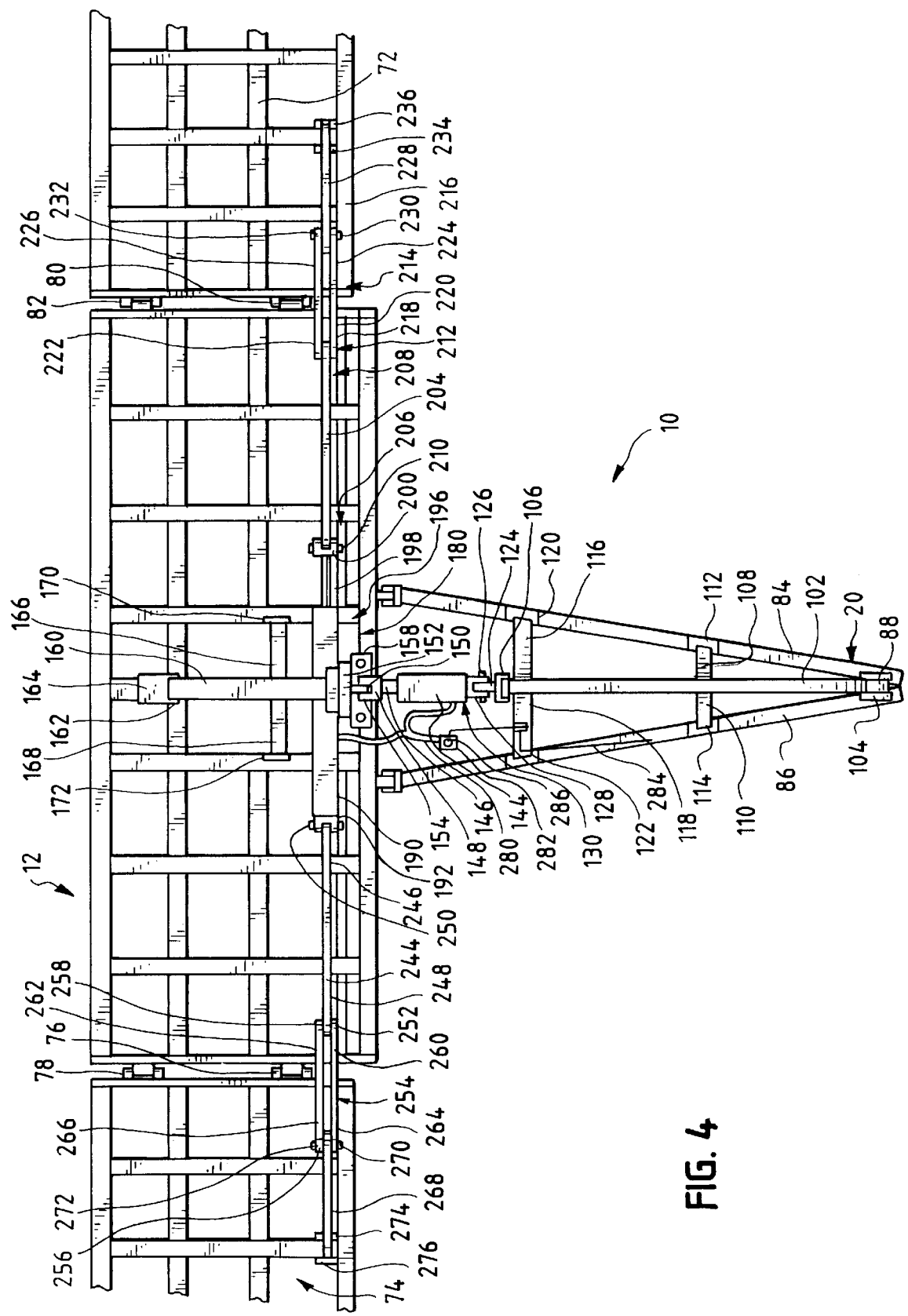
FIG. 4 is a top view of the seeder with the weight distribution system according to the present invention.

FIG. 3 shows a perspective view of the weight distribution assembly 10 on the seeder 12 according to the present invention. FIG. 4 shows a top view of the weight distribution assembly 10 and seeder 12. With reference to FIGS. 3 and 4, the weight distribution system 10 has an elongated front brace 102 which slopes upward from the coupler 88 of the tow hitch 20. One end of the elongated front brace 102 is bolted to a plate 104 which is attached to the tow hitch 20 near the coupler 88. The other end of the elongated front brace 102 is connected to a front pivot plate 106 which is suspended at a point above the tow hitch 20. The elongated front brace 102 is supported by two lateral bracing members 108 and 110 which are attached to mounting plates 112 and 114 respectively. The mounting plates 112 and 114 are bolted to the arms 84 and 86. The lateral bracing members 108 and 110 support the elongated front brace 102 from the arms 84 and 86. An additional two lateral bracing members 116 and 118 support the elongated front brace 102 above the tow hitch 20. The lateral bracing members 108 and 110 are longer than the lateral bracing members 116 and 118 to suspend the front brace 102 at an angle. The lateral bracing members 116 and 118 are attached to the arms 84 and 86 by mounting plates 120 and 122 respectively.

The front pivot plate 106 has a receiving member 124 on the opposite side from the elongated front brace 102. The receiving member 124 is rotatably coupled to a front pivot bracket 126. A bushing 128 is inserted between the front pivot bracket 126 and the receiving member 124 so the receiving member 124 rotates around the bushing 128 relative to the front pivot bracket 126.

The front pivot bracket 126 is coupled to a center actuator 130. The center actuator 130 has a front wall 132. The front wall 132 is bolted to the front pivot bracket 126. The center actuator 130 contains a hydraulic cylinder 144. The center actuator 130 has a stroke rod 146 which moves laterally within the hydraulic cylinder 144. The free end of the stroke rod 146 is attached to a rear pivot bracket 148. The rear pivot bracket 148 is rotatably mounted on a receiving member 150 mounted on the top end of a rear pivot plate 152. A bushing 154 is provided between the pivot bracket 148 and receiving member 150 such that the pivot bracket 148 rotates around the bushing 154 in relation to the rear pivot plate 152. The bottom end of the rear pivot plate 152 is mounted by a hinge 156 to a mounting plate 158. The mounting plate 158 is in turn bolted to the support frame 24. One end of the rear brace 160 is suspended above the support frame 24.

The opposite end of the rear pivot plate 152 from the receiving member 150 is in proximity to one end of a rear brace 160. The rear pivot plate 152 swings on the hinge 156 and may be moved in contact with the rear brace 160. The rear brace 160 slopes from the top of the rear pivot plate 152 to the rear of the support frame 24. The opposite end of the rear brace 160 is attached to a mounting bracket 162 which is bolted to an upright post 164 on the support frame 24. The rear brace 160 is supported by two lateral support members 166 and 168 which elevate the rear brace 160 above the support frame 24. The lateral support members 166 and 168 are attached to mounting plates 170 and 172 respectively which are bolted to the support frame 24. An additional center support member 174 is mounted between the rear brace 160 and the support frame 24 for additional support of the rear brace 160.

A wing actuator 180 is located in a perpendicular orientation to the cylinder actuator 130. The wing actuator 180 has a closed end 190 which is coupled to a right pivot bracket 192. The wing actuator 180 has a hydraulic cylinder 196. The hydraulic cylinder 196 has a stroke rod 198 which moves laterally within the cylinder 196.

The free end of the stroke rod 198 is attached to a left pivot bracket 200. The left pivot bracket 200 is coupled to a left wing bar 204. The left wing bar 204 has a proximal end 206 which is rotatably coupled to the pivot bracket 200. The left wing bar 204 also has a distal end 208 which extends over the hinges 80 and 82 attached to the left wing 72. A bushing 210 is inserted through the left pivot bracket 200 and the proximal end 206 of the left wing bar 204. The left wing bar 204 rotates around the bushing 210 relative to the left pivot bracket 200.

The distal end 208 of the left wing bar 204 is rotatably coupled at a pivot point 212 to a left wing support bar 214. The wing support bar 214 has a distal end 216 and a proximal end 218. The wing support bar 214 has a front plate 220 and a back plate 222 rotatably connected at the distal end 216 to the pivot point 212. The front and back plates 220 and 222 each have lateral slots 224 and 226 located on the proximal end 218.

A left wing support bracket 228 has a pin 230 on the front side which is engaged to slide in the lateral slot 224 and a pin 232 on the back side which is engaged to slide in the lateral slot 226. The left wing support bracket 228 has two support members 234 and 236 which are bolted to the left wing 72. The support bracket 228 suspends the left wing bar 204 and the left wing support bar 214 above the support frame 24 and the left wing 72.

The combination of the pins 230 and 232 on the support bracket 228 and the slots 224 and 226 of the left wing support bar 214 allows the left wing 72 to freely fold upward for transport and storage. The left wing 72 may be seen in an upright position in FIG. 5. In this position, the left wing support bar 214 pivots about the pivot point 212 to an upright position relative to the left wing bar 204. The pins 230 and 232 and thus the support bracket 228 is allowed to traverse down the lateral slots 224 and 226 thus allowing the left wing 72 to rotate upward.

Returning to FIGS. 3–4, the right pivot bracket 192 is coupled to a right wing bar 244. The right wing bar 244 has a proximal end 246 which is rotatably coupled to the right pivot bracket 192. The right wing bar 244 also has a distal end 248 which extends over the hinges 76 and 78 attached to the right wing 74. A bushing 250 is inserted through the right pivot bracket 192 and the proximal end 246 of the right wing bar 244. The right wing bar 244 rotates around the bushing 250 relative to the right pivot bracket 192.

The distal end 248 of the right wing bar 244 is rotatably coupled at a pivot point 252 to a right wing support bar 254. The right wing support bar 254 has a distal end 256 and a proximal end 258. The right wing support bar 254 has a front plate 260 and a back plate 262 rotatably connected at the distal end 256 to the pivot point 252. The front and back plates 260 and 262 each have lateral slots 264 and 266 located on the proximal end 258.

A right wing support bracket 268 has a pin 270 on the front side which is engaged to slide in the lateral slot 264 and a pin 272 on the back side which is engaged to slide in the lateral slot 266. The right wing support bracket 268 has two support members 274 and 276 which are bolted to the right wing 74. The right wing support bracket 268 suspends the right wing bar 244 and the right wing support bar 254 above the support frame 24 and the right wing 74.

As with the left wing 72, the combination of the pins 270 and 272 on the support bracket 268 and the slots 264 and 266 of the right wing support bar 244 allows the right wing 74 to freely fold upward for transport and storage.

The center actuator 130 and wing actuator 180 are fluidly interconnected in parallel along a hydraulic conduit 280 to a controllable relief valve 282. The relief valve 282 allows hydraulic fluid flow from a fluid source such as the hydraulic port 22 on the work vehicle 14. The relief valve 282 is opened and closed by a control line 284. The hydraulic conduit 280 has a pressure gauge 286 to measure the hydraulic pressure to the center and wing actuators 130 and 180. In the preferred embodiment, the pressure gauge 286 and relief valve 282 are located on the frame structure 24. The operator controls the relief valve 282 by a control (not shown) in the work vehicle 14 through the control line 284.

In operation, a continuous flow of oil is provided through the hydraulic conduit 280 by turning the relief valve 282 on. The operator can regulate the relief valve 282 to allow hydraulic fluid flow to pressurize the center actuator 130 and wing actuator 180 at a desired pressure level. The stroke rods 146 and 200 of the center and wing actuators 130 and 180 may move in and out against the weight reducing pressure as the front gauge wheels 26 follow the contour of the ground over which the seeder 12 is towed. The pressure for the center and wing actuators 130 and 180 may be adjusted depending on the consistency or density of the ground.

The system provides a means of removing some or most of the weight on the front gauge wheels 26 without interfering with their function of keeping the front of the seeder 12 at a constant depth to assist in seeding operations. When the wing actuator 180 is activated, the stroke rod 200 extends, thus providing force on the right wing bar 244 and the left wing bar 204. In this manner, the weight of the left and right wings 72 and 74 is transferred to the center of the support frame 24. When the center actuator 130 is activated, the stroke rod 146 extends providing force against the front brace 102 and the rear brace 160. This force pivots the tow bar 20 downward on the pivots 92 and 94 attached to arms 84 and 86 and bushing 128 attached to the front brace 102. In this manner, weight is transferred to the drawbar 16 of the work vehicle 14. Correspondingly, the stroke rod 146 imparts force to rotate the rear pivot plate 152 backward. The rear pivot plate 152 contacts the rear brace 160 causing the rear of the support frame 24 to rotate on the rear packing wheels 28.

In this manner, some of the reduced weight from the front gauge wheels 26 is transferred to the rear packing wheels 28. The other part of the weight is transferred to the drawbar 16 attached to the work vehicle 14. In the preferred embodiment, the front gauge wheels 26 are located equidistant from the rear packing wheels 28 and the drawbar 16. Thus, 50% of the weight is distributed to the rear packing wheels 28 and 50% of the weight is distributed to the draw bar 16. However, depending on the location of the front gauge wheels 26 in relation to the drawbar 16 and the rear packing wheels 28, different percentages of weight may be distributed to the drawbar 16 and the rear packing wheels 28. The transfer of weight allows for a more uniform seeding depth and also results in the additional benefit of more traction for the work vehicle.

Alternatively, the relief valve 282 may be replaced with either a gas-charged or spring-charged accumulator. The operator may then add or remove oil to the system 10 by operator the control valve to obtain the desired pressure or weight transfer. The accumulator allows the center and wing actuators 142 and 194 to move in and out depending on the contour of the ground. The center and wing actuators 142 and 194 may be partially or wholly replaced by springs in order to provide contour tracking of the front gauge wheels 26.

It will be apparent to those skilled in the art that various modifications and variations can be made in the method and system of the present invention without departing from the spirit or scope of the invention. For example, many other actuators and mechanical attachments may be used to distribute the weight away from the front gauge wheels. Thus, the present invention is not limited by the foregoing descriptions but is intended to cover all modifications and variations that come within the scope or the spirit of the invention and the claims that follow.

What is claimed is:

1. A weight distribution system for a towed implement assembly having a frame structure, a front gauge wheel suspended by the frame structure, a rear wheel suspended by the frame structure to the rear of the front gauge wheel, and a tow hitch having one end pivotally connected to the front of the frame structure and an opposite end for coupling to a work vehicle, the weight distribution system comprising:

a front brace having a first end suspended above the tow hitch and a second end coupled to the opposite end of the tow hitch;

a center actuator having a front member and a rear member which may be moved relative to each other, the front member coupled to the first end of the front brace;

a rear brace having a first end suspended above the frame structure and a second end in contact with the rear member of the center actuator;

wherein the front gauge wheel is raised when the front and rear members are moved relative to each other by the center actuator;

wherein the frame structure has a foldable right wing and a foldable left wing, the left and right wings being positioned perpendicularly from the tow hitch, wherein the foldable right and left wings may be folded up; the system further comprising:

a wing actuator having a right member and a left member in movable relation to each other;

a right wing bar perpendicular to said tow hitch having a proximal end coupled to the right member of the wing actuator and a distal end coupled to the right wing;

a left wing bar perpendicular to said tow hitch having a proximal end coupled to the left member of the wing actuator; and wherein the right and left members of the wing actuator may be extended relative to each other to distribute weight from the right and left wings.

2. The system of claim 1 wherein the center actuator is a hydraulic cylinder.

3. The system of claim 2 wherein the center actuator includes a spring coupled to the hydraulic cylinder.

4. The system of claim 2 further comprising:

a hydraulic fluid pump;

a hydraulic fluid conduit fluidly coupled between the fluid pump and the hydraulic cylinder; and a relief valve on the conduit which controls the flow to the hydraulic cylinder.

5. The system of claim 2 further comprising:

a hydraulic fluid conduit coupled to the hydraulic cylinder; and an accumulator coupled to the hydraulic fluid conduit which allows constant pressure to be maintained in the hydraulic cylinder.

6. The system of claim 3 further comprising:

a rear contact plate having a base end and a top end;

a hinge coupled to the base end of the rear contact plate and the frame structure such that the rear contact plate is perpendicular to the frame structure; and wherein the second end of the center actuator is coupled to one side of the top end of the rear contact plate and the opposite side of the rear contact plate may be rotated on the hinge into contact with the rear brace.

7. The system of claim 1 wherein the frame structure has a lateral cross member in proximity of the front gauge wheel, a seed insertion device suspended by the lateral cross member, a seed container, and a tube connecting the seed insertion device to the seed container.

8. A method of distributing weight on a towed implement assembly having a frame structure with a front gauge wheel, a rear wheel to the rear of the front gauge wheel; a tow hitch having a rear end pivotally coupled to the front of the frame structure and a front end coupled to a work vehicle; a right foldable wing and a left foldable wing, the wings being coupled to the assembly by hinges and perpendicular to said tow hitch; the method comprising the steps of:

providing a front brace sloped between the front end of the tow hitch and a point above the front of the frame structure;

providing a sloped rear brace between the rear end of the frame structure and a point above the rear of the frame structure;

providing force between the front and rear braces such that the frame structure rotates around the rear wheel and the tow hitch pivots such that weight is distributed to the rear wheel and the work vehicle;

transferring weight from the wings to the frame structure by coupling a right bar on the right wing, coupling a left bar on the left wing, coupling a wing actuator to the right and left bars, and actuating the wing actuator.

9. The method of claim 8 wherein the step of providing force between the front and rear brace is performed by a hydraulic cylinder.

10. The method of claim 9 further comprising the step of coupling an accumulator to the hydraulic cylinder and allowing the pressure to the hydraulic cylinder to adjust to ground contours.

11. The method of claim 9 wherein a spring is coupled to the hydraulic cylinder.

12. The method of claim 9 further the steps of: fluidly coupling a hydraulic fluid conduit between a fluid pump and the hydraulic cylinder; and controlling the flow of the hydraulic cylinder by a relief valve on the conduit.

\* \* \* \* \*